US010412402B2

United States Patent
Lin et al.

(10) Patent No.: US 10,412,402 B2
(45) Date of Patent: Sep. 10, 2019

(54) METHOD AND APPARATUS OF INTRA PREDICTION IN VIDEO CODING

(71) Applicant: MEDIATEK INC., Hsin-Chu (TW)

(72) Inventors: Jian-Liang Lin, Su'ao Township, Yilan County (TW); Yi-Wen Chen, Taichung (TW); Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 52 days.

(21) Appl. No.: 15/526,076

(22) PCT Filed: Dec. 4, 2015

(86) PCT No.: PCT/CN2015/096407
§ 371 (c)(1),
(2) Date: May 11, 2017

(87) PCT Pub. No.: WO2016/091122
PCT Pub. Date: Jun. 16, 2016

(65) Prior Publication Data
US 2017/0310986 A1    Oct. 26, 2017

Related U.S. Application Data

(60) Provisional application No. 62/090,625, filed on Dec. 11, 2014.

(51) Int. Cl.
*H04N 19/503* (2014.01)
*H04N 19/117* (2014.01)
*H04N 19/82* (2014.01)

(52) U.S. Cl.
CPC ......... *H04N 19/503* (2014.11); *H04N 19/117* (2014.11); *H04N 19/82* (2014.11)

(58) Field of Classification Search
CPC ..... H04N 19/503; H04N 19/82; H04N 19/117
(Continued)

(56) References Cited

U.S. PATENT DOCUMENTS

| 2005/0201633 A1* | 9/2005 | Moon | H04N 19/176 |
| | | | 382/268 |
| 2011/0228854 A1 | 9/2011 | Shin et al. | |
| 2013/0230106 A1* | 9/2013 | Song | H04N 19/176 |
| | | | 375/240.13 |

FOREIGN PATENT DOCUMENTS

| CN | 103414895 A | 11/2013 |
| WO | WO 2013/189257 A1 | 12/2013 |

OTHER PUBLICATIONS

International Search Report dated Mar. 7, 2016, issued in application No. PCT/CN2015/096407.

(Continued)

*Primary Examiner* — Nam D Pham
(74) *Attorney, Agent, or Firm* — McClure, Qualey & Rodack, LLP

(57) ABSTRACT

A method and apparatus for applying filter to Intra prediction samples are disclosed. According to an embodiment of the present invention, a filter is applied to one or more prediction samples of the Initial Intra prediction block to form one or more filtered prediction samples. For example, the filter is applied to the prediction sample in the non-boundary locations of the Initial Intra prediction block. Alternatively, the filter is applied to all prediction samples in the Initial Intra prediction block. The filtered Intra prediction block comprising one or more filtered prediction samples is used as a predictor for Intra prediction encoding or decoding of the current block. The filter corresponds to a FIR (finite impulse response) filter or an IIR (infinite impulse response) filter.

20 Claims, 7 Drawing Sheets

(58) Field of Classification Search
USPC .................................................. 375/240.12
See application file for complete search history.

(56) References Cited

OTHER PUBLICATIONS

Sullivan, G.J.., et al.; "Overview of the High Efficiency Video Coding (HEVC) Standard;" IEEE Transactions on Circuits and Systems for Video Technology; vol. 22; No. 12; Dec. 2012; pp. 1649-1668.

Zheng, Y., et al.; "CE13: Mode Dependent Hybrid Intra Smoothing;" Joint Collaborative Team on Video Coding (JCT-VC) of ITU-T SG16 WP3 and ISO/IEC JTC1/SC29/WG11; Jan. 2011; pp. 1-6.

Silcock, P., et al.; "Extension of HM7 to Support Additional Chroma Formats;" Joint Collaborative Team on Video Coding (JCT-VC) of ITU-T SG 16 WP 3 and ISO/IEC JTC 1/SC 29/WG 11; Jul. 2012; pp. 1-16.

Maani, E., et al; "Intra mode coding using logical mode numbering;" Joint Collaborative Team on Video Coding (JCT-VC) of ITU-T SG16 WP3 and ISO/IEC JTC1/SC29NVG11; Feb. 2012; pp. 1-4.

Van Der Auwera, G., et al.; "CE3.b: SDIP Harmonization with Deblocking, MDIS and HE Residual Coding;" Joint Collaborative Team on Video Coding (JCT-VC) of ITU-T SG16 WP3 and ISO/IEC JTC1/SC29NVG11; Jul. 2011; pp. 1-22.

An, J., et al.; "Residue scan for intra transform skip mode;" Joint Collaborative Team on Video Coding (JCT-VC) of ITU-T SG 16 WP 3 and ISO/IEC JTC 1/SC 29/WG 11; Jul. 2012; pp. 1-5.

\* cited by examiner

Neighboring reconstructed pixels
Boundary pixels in a sub-unit
Non-boundary pixels in a sub-unit Neighboring reconstructed pixels
Boundary pixels in sub-unit
Non-boundary pixels in sub-unit

METHOD AND APPARATUS OF INTRA PREDICTION IN VIDEO CODING

CROSS REFERENCE TO RELATED APPLICATIONS

The present invention claims priority to U.S. Provisional Patent Application, Ser. No. 62/090,625, filed on Dec. 11, 2014. The U.S. Provisional Patent Application is hereby incorporated by reference in its entirety.

TECHNICAL FIELD

The present invention relates video coding. In particular, the present invention relates to advanced Intra prediction to improve coding efficiency of Intra prediction.

BACKGROUND

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block. A CU may begin with a largest CU (LCU), which is also referred as coded tree unit (CTU) in HEVC and each CU can be recursively split into four smaller CUs until the predefined minimum size is reached. Once the splitting of CU hierarchical tree is done, each CU is further split into one or more prediction units (PUs) according to prediction type and PU partition. Each CU or the residual of each CU is divided into a tree of transform units (TUs) to apply 2D transforms such as DCT (discrete cosine transform) or DST (discrete sine transform).

In general, a CTU consists of one luma coding tree block (CTB) and two corresponding chroma CTBs. A CU consists of one luma coding block (CB) and two corresponding chroma CBs. Similarly, a PU consists of one luma prediction block (PB) and two corresponding chroma PBs, and a TU consists of one luma transform block (TB) and two corresponding chromaTBs. However, exceptions may occur because the minimum TB size is 4×4 for both luma and chroma (i.e., no 2×2 chroma TB supported for 4:2:0 color format) and each Intra chroma CB always has only one Intra chroma PB regardless of the number of Intra luma PBs in the corresponding Intra luma CB.

For an Intra CU, the luma CB can be partitioned into and predicted by one or four luma PBs, and each of the two chroma CBs is always predicted by one chroma PB. Each luma PB has one Intra luma prediction mode and the two chroma PBs share one Intra chroma prediction mode. Moreover, for the Intra CU, the TB size cannot be larger than the PB size. In each PB, the Intra prediction is applied to predict samples and the generate prediction residues for each TB inside the PB. The Intra prediction utilizes neighboring reconstructed samples of the TB. For each PB, in addition to 33 directional Intra prediction modes, DC and planar modes are also supported to predict flat regions and gradually varying regions, respectively.

For each Inter PU, one of three prediction modes including Inter, Skip, and Merge modes, can be selected. The motion vector predictor is selected from a candidate set according to a motion vector competition (MVC). The candidate set includes spatial and temporal motion candidates derived from reconstructed spatial and temporal neighboring blocks. Multiple references to the motion estimation allow finding the best reference in two possible reconstructed reference picture lists (namely List 0 and List 1). For the Inter mode (also termed as advanced motion vector prediction (AMVP) mode), Inter prediction indicators (List 0, List 1, or bi-directional prediction), reference indices, motion candidate indices, motion vector differences (MVDs) and prediction residual are transmitted. As for the Skip mode and the Merge mode, only Merge indices are transmitted since the current PU inherits the Inter prediction indicator, reference indices, and motion vectors from a neighboring PU referred by the coded Merge index. In the case of a Skip coded CU, the residual signal is also omitted. Quantization, entropy coding, and deblocking filter (DF) are also in the coding loop of HEVC. The basic operations of these three modules are conceptually similar to those used in H.264/AVC.

The HEVC standard also includes Sample Adaptive Offset (SAO) as an in-loop filtering technique applied after DF. SAO aims to reduce sample distortion by classifying deblocked samples into different categories and then adding an offset to deblocked samples of each category.

Intra Prediction Modes

In Intra prediction mode according to HEVC, the decoded boundary samples of adjacent blocks are used as reference data for spatial prediction of a current block. All TUs within a PU use the same associated Intra prediction mode for the luma component and the chroma components. The encoder selects the best luma Intra prediction mode of each PU from 35 options corresponding to 33 directional prediction modes, a DC mode and a Planar mode. The 33 possible Intra prediction directions are illustrated in FIG. 1. The mapping between the intra prediction direction and the intra prediction mode number is shown in FIG. 2. Besides, Planar mode is mapped to Intra prediction mode number 0 while DC mode is mapped to Intra prediction mode number 1.

For the chroma component of an Intra PU, the encoder selects the best chroma prediction modes among five modes including Planar, DC, Horizontal, Vertical and a direct copy of the Intra prediction mode for the luma component. The mapping between Intra prediction direction and Intra prediction mode number for chroma is shown in Table 1.

TABLE 1

|  | Intra prediction direction | | | | |
| --- | --- | --- | --- | --- | --- |
| Intra_chroma_pred_mode | 0 | 26 | 10 | 1 | X (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

When the Intra prediction mode number for the chroma component is 4, the Intra prediction direction for the luma component is used for the Intra prediction sample generation for the chroma component. When the Intra prediction mode number for the chroma component is not 4 and it is identical to the Intra prediction mode number for the luma component, the Intra prediction direction of 34 is used for the Intra prediction sample generation for the chroma component.

Filtering of Neighboring Samples

For the luma component, the neighboring samples used for Intra prediction sample generations are filtered before the generation process. The filtering is controlled by the given Intra prediction mode and transform block size. If the Intra prediction mode is DC or the transform block size is equal to 4×4, neighboring samples are not filtered. If the mode distance between the given Intra prediction mode and vertical mode (or horizontal mode) is larger than predefined threshold, the filtering process is enabled. The predefined threshold is specified in Table 2, where nT represents the transform block size.

TABLE 2

|  | nT = 8 | nT = 16 | nT = 32 |
|---|---|---|---|
| Threshold | 7 | 1 | 0 |

For neighboring sample filtering, [1, 2, 1] filter and bi-linear filter are used. The bi-linear filtering is conditionally used if all of the following conditions are true.
  strong_Intra_smoothing_enable_flag is equal to 1
  transform block size is equal to 32
  Abs(p[−1][−1]+p[nT*2−1][−1]−2*p[nT−1][−1])<(1<<(BitDepthY−5))
  Abs(p[−1][−1]+p[−1][nT*2−1]−2*p[−1][nT−1])<(1<<(BitDepthY−5))

Boundary Filtering for DC, Vertical and Horizontal Modes

For DC mode in the HEVC, a boundary filter (or smoothing filter) is applied on DC mode. The boundary prediction samples of DC mode will be smoothed with an [1, 3] or [1, 2, 1] filter to reduce the blocking artifact as shown in FIG. 3. In FIG. 3, bold line 310 indicates a horizontal block boundary and bold line 320 indicates a vertical block boundary. The filter weights for filtering the edge pixels and the corner pixel are shown in block 330.

For Vertical and Horizontal Intra prediction directions, a gradient based boundary filter is applied according to current HEVC standard. FIG. 4 shows an example for the gradient based boundary smoothing filter for Vertical Intra prediction direction. The prediction pixels for the first column of the current block are smoothed according to $\hat{P}_i = \hat{P} + (L_i - AL) >> 2$, i=0, 1, 2, ..., (N−1) and N is the block height. For horizontal Intra prediction, the boundary smoothing can be derived similarly for the first row in the current block.

While the boundary smoothing has helped to improve the visual quality of the Intra prediction, it is desirable to extend the existing boundary smoothing in order to further improve coding efficiency of Intra prediction.

SUMMARY

A method and apparatus for applying filter to Intra prediction samples are disclosed. According to an embodiment of the present invention, a filter is applied to one or more prediction samples of the Initial Intra prediction block to form one or more filtered prediction samples, in which the filter inputs of the filter comprise a current prediction sample and one or more reference values associated with one or more non-current prediction samples of the Initial Intra prediction block. The filtered Intra prediction block comprising one or more filtered prediction samples is used as a predictor for Intra prediction encoding or decoding of the current block. The filter corresponds to a FIR (finite impulse response) filter or an IIR (infinite impulse response) filter.

In one embodiment, the filter is applied to the prediction samples in non-boundary locations of the Initial Intra prediction block to form the filtered prediction samples.

The filter inputs of the filter may comprise the current prediction sample, one or more prediction samples excluding the current prediction sample (i.e., the non-current prediction samples), and one or more neighboring reference reconstructed samples from one or more neighboring blocks of the current block. In one example, the filter inputs consists of the current prediction sample and four adjacent samples of the current prediction sample at a left position, an upper-left position, an above position and an upper-right position. The filter coefficients in this case may correspond to ½, ⅛, ⅛, ⅛ and ⅛ respectively. Alternatively, the filter may comprise the current prediction sample, one or more filtered prediction samples before the current prediction sample, and one or more neighboring reference reconstructed samples from one or more neighboring blocks of the current block.

In one embodiment, whether to enable or disable the Intra prediction filtering is determined implicitly according to Intra prediction mode of the current block, one or more Intra prediction modes of one or more neighboring blocks, or both, and wherein the current block and said one or more neighboring blocks corresponds to a PU (prediction unit). For example, whether to enable or disable the Intra prediction filtering may depend on whether the Intra prediction mode of the current block is an odd or even number. In another example, whether to enable or disable the Intra prediction filtering may depend on whether the Intra prediction mode of the current block is an odd or even number with one or more exception Intra prediction modes selected from a group comprising a planar mode, a DC mode, a vertical mode and a horizontal mode. In another embodiment, whether to enable or disable the Intra prediction filtering is determined according to a flag signaled in a sequence, view, picture, slice, SPS (sequence parameter set), VPS (video parameter set), APS (adaptation parameter set), CTU (coding tree unit), CTB (coding tree block), LCU (largest coding unit), CU (coding unit), PU (prediction unit), TU level (transform unit), or a combination thereof.

In one embodiment, the filter coefficients for the filter can be signaled in a sequence, view, picture, slice, SPS (sequence parameter set), VPS (video parameter set), APS (adaptation parameter set), CTU (coding tree unit), CTB (coding tree block), LCU (largest coding unit), CU (coding unit), PU (prediction unit), TU level (transform unit), or a combination thereof. In another embodiment, filter coefficients for the filter are derived using a Wiener filter design process. The filter coefficients for the filter can be derived and updated for each picture, slice, CTU (coding tree unit), CTB (coding tree block), LCU (largest coding unit), CU (coding unit), or PU (prediction unit).

In yet another embodiment, the current block is divided into multiple current sub-units, the initial Intra prediction block is divided into multiple Intra prediction sub-units accordingly, and each Intra prediction sub-unit is filtered and used as a sub-unit prediction for a corresponding current sub-unit. The boundary pixels in each of the multiple Intra prediction sub-units are unfiltered or filtered using a FIR filter, and non-boundary pixels in each of the multiple Intra prediction sub-units are filtered using an IIR filter. Furthermore, whether to enable or disable the Intra prediction filtering for each current sub-unit may be according to a predefined rule.

When the current block comprises a luma block and two chroma blocks, the Intra prediction filtering may be applied to the luma block only or applied to the luma block and the two chroma blocks. Furthermore, one or more flags can be used to enable or disable the Intra prediction filtering for the multiple color blocks.

DETAILED DESCRIPTION

In order to improve the coding efficiency of Intra prediction, new methods to derive or refine the Intra predictor for video coding are disclosed as follow.

Figure 1:
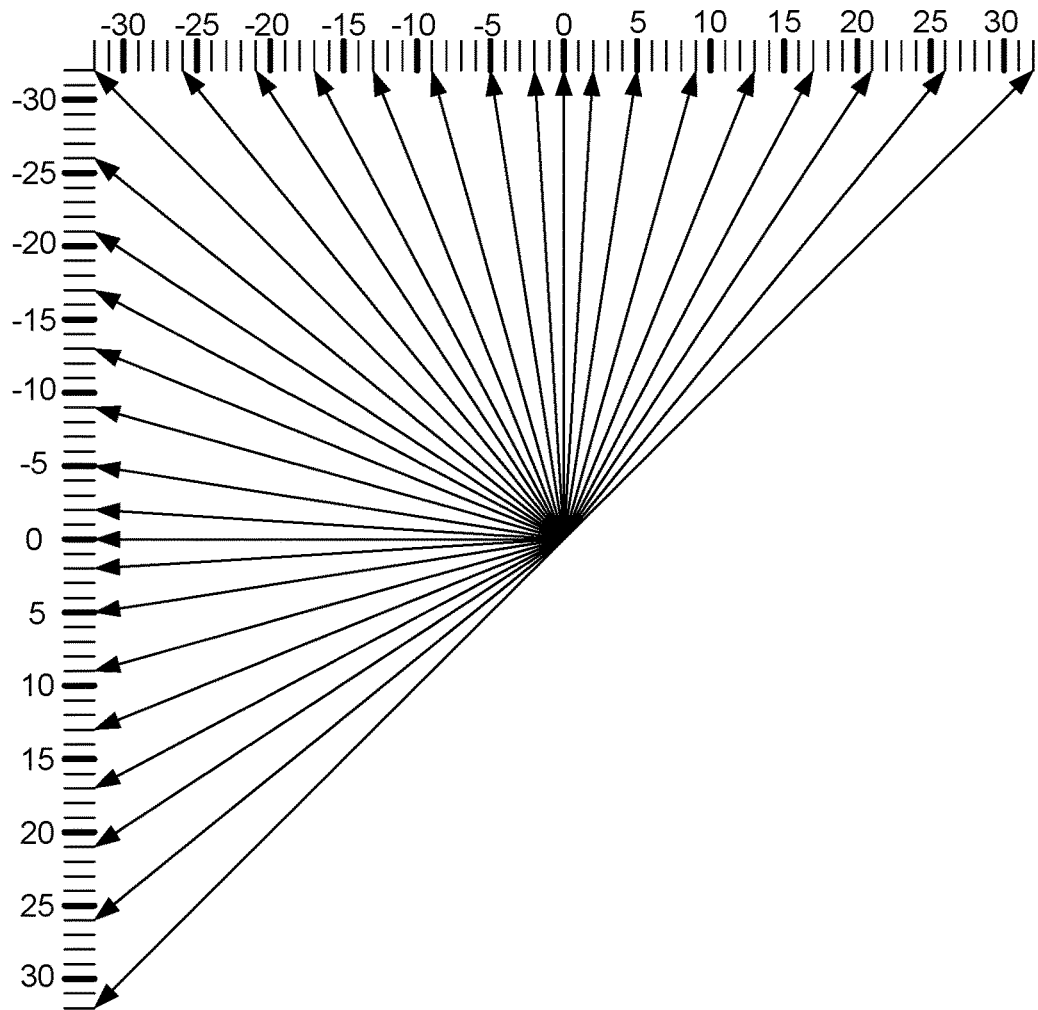
FIG. 1 illustrates the 33 Intra prediction directions according to the current HEVC (high efficiency video coding) standard.
Figure 2:
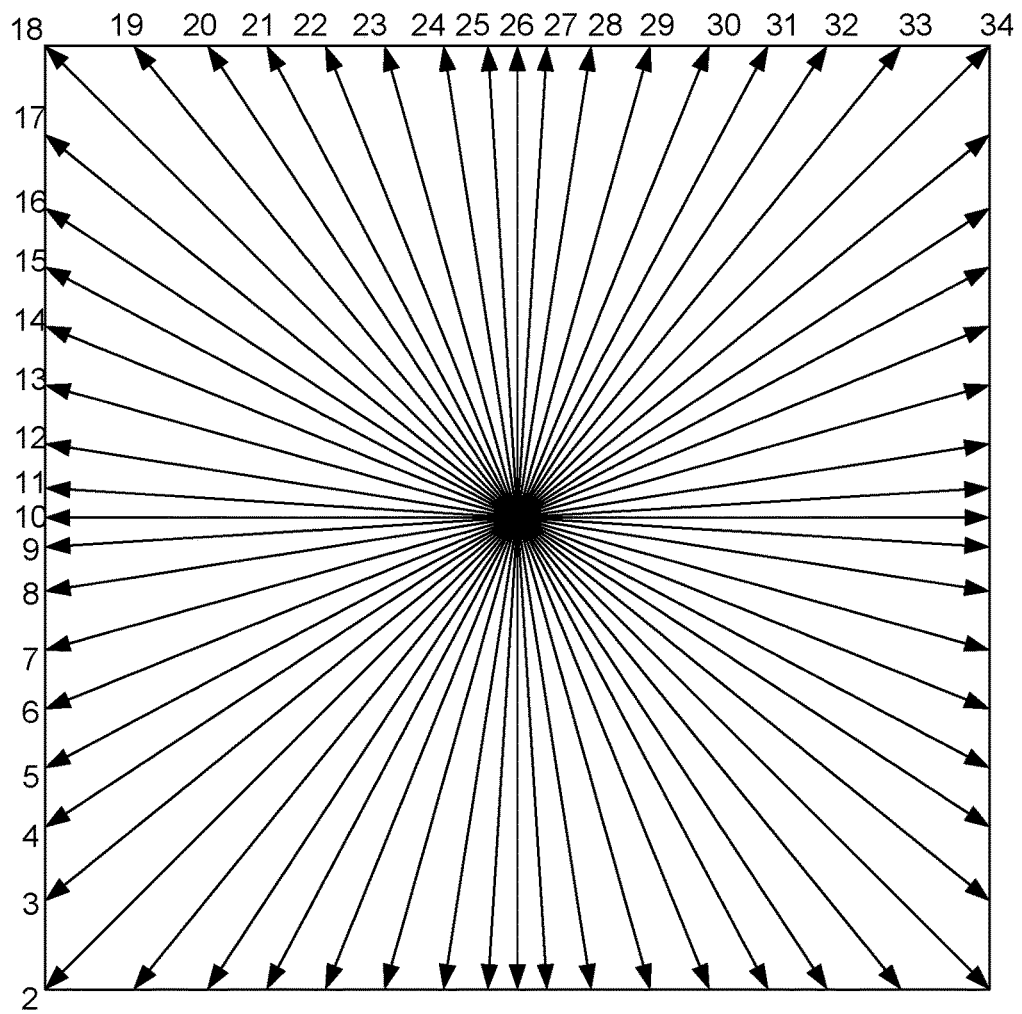
FIG. 2 illustrates the mapping between the Intra prediction directions and the Intra prediction modes according to the current HEVC (high efficiency video coding) standard.
Figure 3:
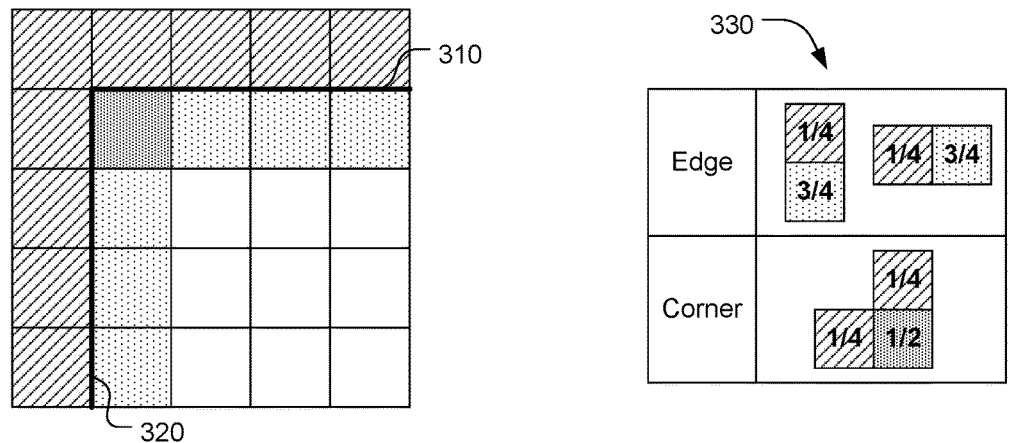
FIG. 3 illustrates the boundary smoothing filter for the DC mode according to the current HEVC (high efficiency video coding) standard.
Figure 4:
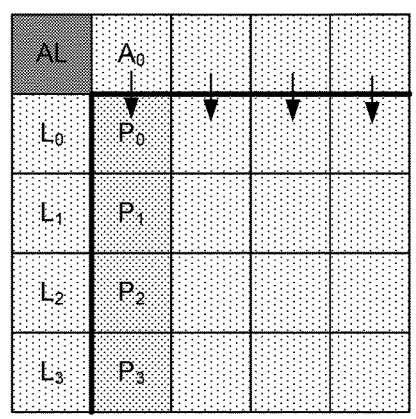
FIG. 4 illustrates the boundary smoothing filter for the vertical mode according to the current HEVC (high efficiency video coding) standard.
Figure 5:
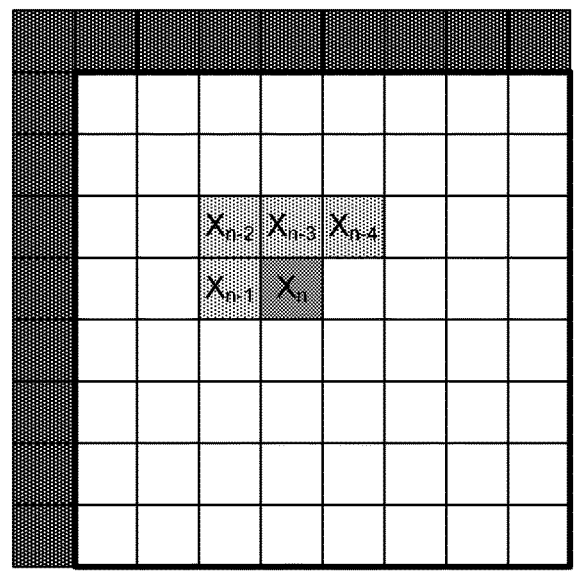
FIG. 5 illustrates an example of Intra prediction filtering according to an embodiment of the present invention.

In one embodiment of the present invention, a filter is applied on the Intra prediction samples as illustrated in FIG. 5, according to the following equations:

$$\hat{X}_n = a_0 X_n + \sum_{k=1}^{N} a_k X_{n-k}, \qquad (1)$$

where $X_n$ corresponds to an Intra prediction sample and $\hat{X}_n$ corresponds to the filtered Intra prediction sample. For easy reference to these terms, the Intra prediction block before the Intra prediction filtering is referred as an initial Intra prediction block. The Intra prediction block after Intra prediction filtering is referred as a filtered Intra prediction block. The Intra prediction sample being applied by the filter for Intra prediction filtering is also referred as a current prediction sample. The Intra prediction samples within the initial Intra prediction block, but other than the current prediction sample are referred as non-current prediction samples.

Figure 6:
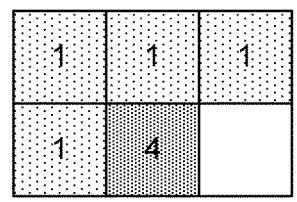
FIG. 6 illustrates an example of filter for Intra prediction filtering according to an embodiment of the present invention.

In the example shown in FIG. 5, N equals to 4. Four adjacent samples (i.e., $X_{n-1}$, $X_{n-2}$, $X_{n-3}$, and $X_{n-4}$) and current prediction sample $X_n$ are used to derive a new predictor as the refined or filtered prediction sample for current prediction sample. In this embodiment, the adjacent samples are all located inside the initial Intra prediction block (i.e., all of the adjacent samples are the non-current prediction samples of the initial Intra prediction block). An example of the filter design for the Intra prediction filtering is shown in FIG. 6, where the weighting factor for the current sample is 4/8 (i.e., ½) and the weighting factor for the four adjacent samples is ⅛.

Figure 7:
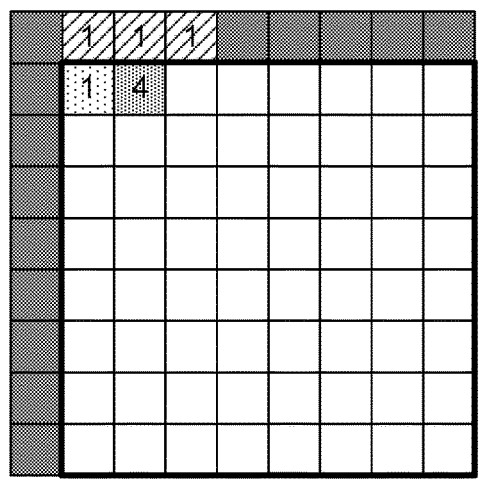
FIG. 7 illustrates an exemplary scenario where one or more adjacent samples correspond to neighbouring reconstructed samples from neighboring reconstructed block of the current block.

In another embodiment of the present invention, the adjacent samples for filter may further include the neighboring reference reconstructed samples adjacent to current Intra prediction block, where the neighboring reference reconstructed samples are from the neighboring blocks of the current Intra prediction block. FIG. 7 illustrates an example of the locations of the adjacent samples, where the adjacent samples include three samples from neighboring reference reconstructed sample (shown as squares filled with slant lines) and one prediction sample from the current Intra prediction block (shown as square filled with dots).

In yet another embodiment, the adjacent samples for filter may include any subset of the prediction samples in current Intra prediction block and the neighboring reference reconstructed samples adjacent to current Intra prediction block.

The filter as shown in equation (1) belongs to the finite impulse response (FIR) filter type, where the filter inputs comprise the current prediction sample and at least one Intra prediction sample after Intra prediction operation (i.e., the non-current prediction sample within the Initial Intra prediction block). The filter inputs may further comprise the neighboring reference reconstructed pixels/samples in the case that the adjacent sample is located outside current Intra prediction block. In other words, the filter inputs are "non-filtered" samples. In another embodiment, the filter inputs include the adjacent filtered samples and current Intra prediction sample. An example of filtering process according to this embodiment is shown in equation (2).

$$\hat{X}_n = a_0 X_n + \sum_{k=1}^{N} a_k \hat{X}_{n-k}, \qquad (2)$$

where $X_n$ corresponds to an Intra prediction sample and $\hat{X}_n$ corresponds to the filtered Intra prediction sample. In equation (2), $\hat{X}_{n-k}$ corresponds to the neighboring filtered Intra prediction samples. Alternatively, $\hat{X}_{n-k}$ corresponds to at least one neighboring filtered Intra prediction sample and at least one neighboring reference reconstructed samples from the neighboring blocks of the current block. The filter shown in equation (2) belongs to an infinite impulse response (IIR) filter, where the filtered samples are used to filter the following samples.

In equations (1) and (2), N can be any positive integer. Please note, the number of adjacent samples/pixels and the positions thereof shown in the foregoing embodiments are for illustrative purposes, the present invention is not limited thereto. That is, the filter design for Intra prediction filtering in another embodiment may be different from the filter design shown in FIG. 6. For example, one or more values associated with samples other than the adjacent samples of the current prediction sample at a left position, an upper-left position, an above position and an upper-right position can be used as filter inputs of the filter for Intra prediction filtering.

The Intra prediction filtering as disclosed in equations (1) and (2) can be controlled by an implicitly flag or an explicitly flag. For the implicit control, the on/off decision can be decided according to the Intra prediction mode of current processing unit, or the Intra prediction mode(s) of the neighboring process unit(s). For example, the Intra prediction filtering is enabled for the odd Intra modes and is disabled for the even Intra modes. In another example, the Intra prediction filtering is disabled for the odd Intra modes and is enabled for the even Intra modes.

The Intra prediction filtering may also be enabled for the odd Intra modes except for the DC mode and disabled for the even Intra modes and DC mode. Alternatively, the Intra prediction filtering may be disabled for the odd Intra modes except the DC mode and is enabled for the even Intra modes and DC mode.

In yet another example, the Intra prediction filtering may be enabled for the odd Intra modes and the Planer, Horizontal and Vertical modes and disabled for the remaining modes. Alternatively, the Intra prediction filtering can be disabled for the odd Intra modes and the Planer, Horizontal and Vertical modes and enabled for the remaining modes.

For the explicit control, a flag can be sent in the sequence, view, picture, slice, SPS (sequence parameter set), VPS (video parameter set), APS (adaptation parameter set), CTU, CTB, LCU, CU, PU, and/or TU level (or header) to control the enabling or disabling of the Intra prediction filtering.

For color video with multiple color components, the Intra prediction filtering can be applied only to the luma component, or only applied to the chroma component, or both luma and chroma components. When the Intra prediction filtering is applied to luma and chroma components, a flag could be used to control the enabling or disabling for both luma and chroma components. In another example, a first flag is used to control the enabling or disabling for the luma component and a second flag is used to control the enabling or disabling for the chroma (Cb and Cr) components. In yet another example, a first flag is used to control the enabling or disabling for luma (Y) component, a second flag is used to control the enabling or disabling for the Cb component, and a third flag is used to control the enabling or disabling for the Cr component.

The proposed Intra prediction filtering could be applied only on one of (R, G, B) components, or applied on more than one of (R, G, B) components. When the Intra prediction filtering is applied on more than one of (R, G, B), a flag could be used to control the enabling or disabling for the said more than one of (R, G, B) components. In another example, a first flag is used to control the enabling or disabling for first component and a second flag is used to control the enabling or disabling for the second and third components. In yet another example, a first flag is used to control the enabling or disabling for the first component, a second flag is used to control the enabling or disabling for the second component, and a third flag is used to control the enabling or disabling for the third component.

The filter coefficients of the Intra prediction filtering can be explicitly transmitted in the bitstream. In this case, the coefficients can be transmitted in the sequence, view, picture, slice, SPS, VPS, APS, CTU, CTB, LCU, CU, PU, and/or TU level (or header) to update the filter coefficients. In the encoder side, the filter coefficients can be derived by using the Wiener filter derivation method. The original sample values and the Intra prediction samples can be used to derive the filter coefficients. The neighboring reconstructed samples can also be used to drive the filter coefficients together with the original samples values and the Intra prediction samples.

Figure 8:
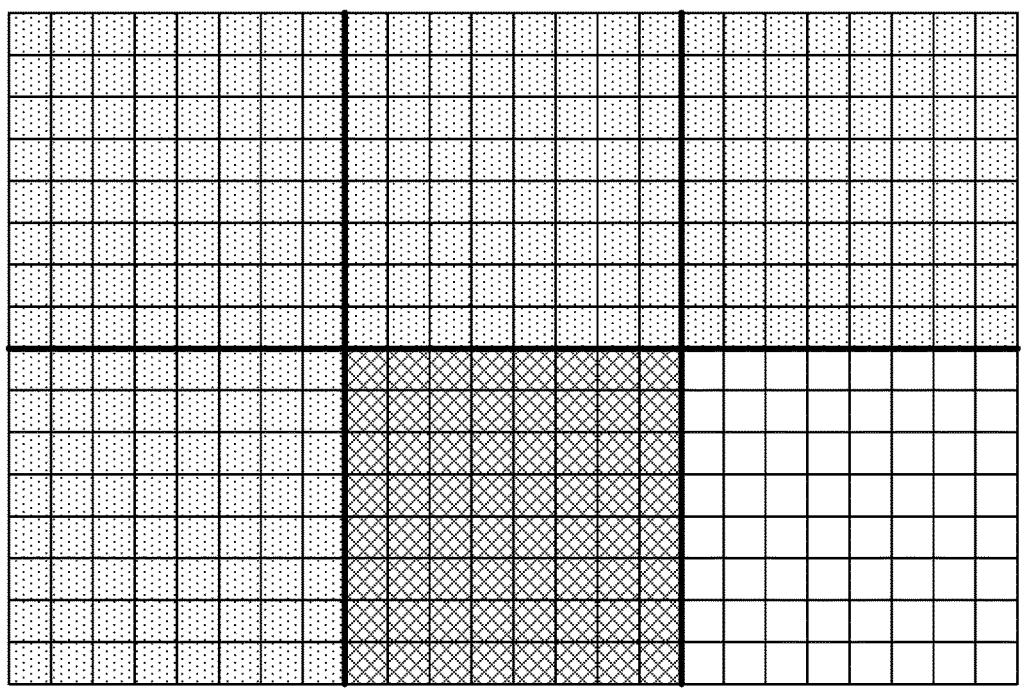
FIG. 8 illustrates an example of using neighbouring reconstructed samples from neighboring reconstructed block of the current block for deriving the filter coefficients of the filter according to an embodiment of the present invention.

The filter coefficients of the Intra prediction filtering can also be implicitly derived in the decoder side. As illustrated in FIG. 8, the neighboring reconstructed samples as shown in dot-filled squares can be used to derive the filter coefficients using the Wiener filter derivation method or other filter design algorithms. The filter coefficients can be derived and updated per PU, CU, TU, LCU, CTB, CTU, slice, or picture.

Figure 9:
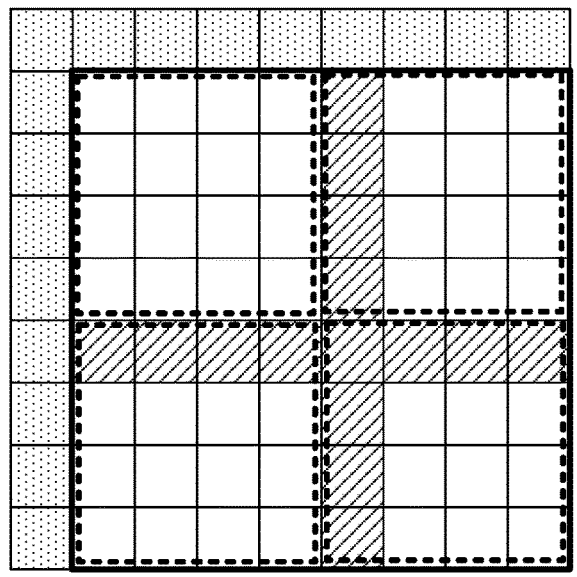
FIG. 9 illustrates an example of sub-unit based Intra prediction filtering according to an embodiment of the present invention.
Figure 10:
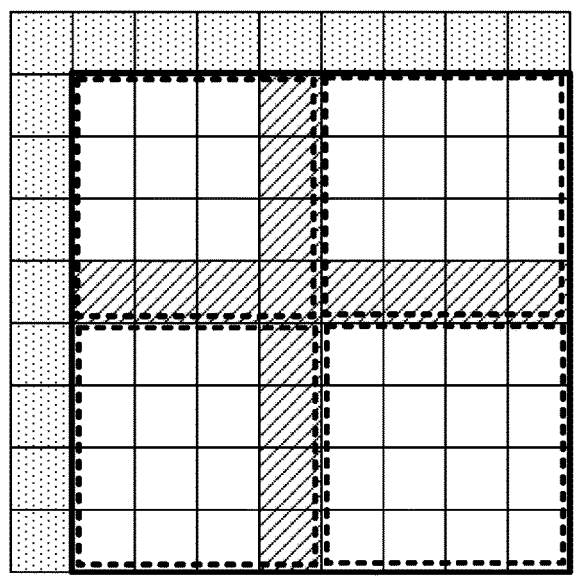
FIG. 10 illustrates another example of sub-unit based Intra prediction filtering according to an embodiment of the present invention.

In one embodiment, the current processing unit is divided into multiple sub-units as indicated by dashed blocks. In order to support the parallel processing for the Intra prediction filtering, the boundary samples as shown in slant-line filled areas in FIG. 9 and FIG. 10 are either unfiltered or using the FIR filter according to equation (1). Other samples in the sub-units are filtered using the IIR filter as shown in equation (2).

In another embodiment, for each sample in a sub-unit, the unfiltered sample is used as the input value if an adjacent input sample belongs to another sub-unit. Otherwise, the filtered value of the adjacent input sample is used as the input value during the filter operation for each sample.

In yet another embodiment, for each sample in a sub-unit, a value derived by the FIR filter is used as the input value if an adjacent input sample belongs to another sub-unit. Otherwise, the IIR filtered value of the adjacent input sample is used as the input value during the filter operation for each sample. As an example shown in FIG. 9, the FIR filter is applied to the boundary samples shown as areas filled with slant lines. The outputs of the filtered boundary samples using FIR filter are only used as the input value for the filter operation of the following samples. However, the final represented value of those boundary samples is still derived use the IIR filter.

In still another embodiment, for each sub-unit, the enabling/disabling of the Intra prediction filtering is determined according to a predefined rule. In one example, the Intra prediction filtering is always disabled for the bottom-right sub-unit. In another example, the proposed filter is only applied to the sub-units located at TU/CU/PU boundary.

Figure 11:
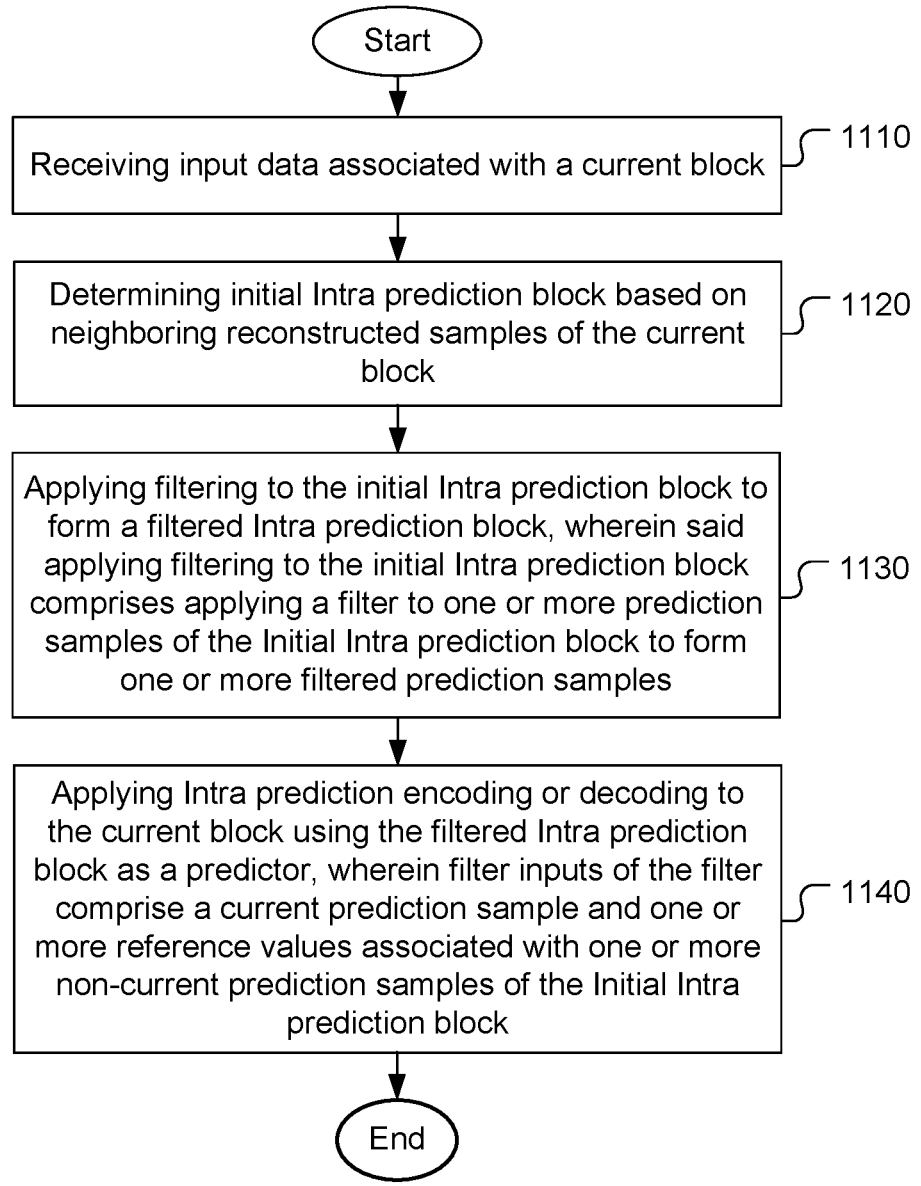
FIG. 11 illustrates an exemplary flowchart of a coding system incorporating Intra prediction filtering according to an embodiment of the present invention.

FIG. 11 illustrates an exemplary flowchart of a coding system incorporating Intra prediction filtering according to an embodiment of the present invention. The system receives input data associated with a current block in step 1110. The input data may correspond to sample data of the current block to be coded at the encoder side or the coded data of the current block in the decoder side. The current block may be retrieved from storage such as a computer memory of buffer (RAM or DRAM). The video bitstream may also be received from a processor such as a processing unit or a digital signal. The initial Intra prediction block is determined based on neighboring reconstructed samples of the current block in step 1120. A filter is then applied to one or more Intra prediction samples of the Initial Intra prediction block to form one or more filtered prediction samples in step 1130. For example, the filter is applied to all Intra prediction samples of the Initial Intra prediction block, or applied to the prediction sample in the non-boundary locations of the Initial Intra prediction block. The filter inputs of the filter comprise a current prediction sample and one or more reference values associated with one or more non-current prediction samples of the Initial Intra prediction block, in which the reference value may be the sample value of the non-current prediction sample within the Initial Intra prediction block, or the sample value of the filtered prediction samples before the current prediction sample. A filtered Intra prediction block comprising one or more filtered prediction samples is used as a predictor for Intra prediction encoding or decoding of the current block in step 1140, where filter inputs of the filter comprise a current prediction sample and one or more reference values associated with one or more non-current prediction samples of the Initial Intra prediction block.

The flowchart shown above is intended to illustrate examples of Intra prediction filtering according an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Intra prediction filtering, the method comprising:
   receiving input data associated with a current block;
   determining Intra prediction mode of the current block;
   determining initial Intra prediction block based on the Intra prediction mode and neighboring reconstructed samples of the current block;
   determining whether to apply filtering to the initial Intra prediction block based on the Intra prediction mode;
   in response to determining applying filtering to the initial Intra prediction block, applying a filter to one or more prediction samples of the Initial Intra prediction block to form a filtered Intra prediction block comprising one or more filtered prediction samples; and
   applying Intra prediction encoding or decoding to the current block using the filtered Intra prediction block as a predictor for the current block,
   wherein filter inputs of the filter comprise at least one of a current prediction sample and one or more reference values associated with one or more non-current prediction samples of the Initial Intra prediction block.

2. The method of claim 1, wherein said applying filtering to the initial Intra prediction block comprises applying a filter to one or more prediction samples in non-boundary locations of the Initial Intra prediction block to form one or more filtered prediction samples.

3. The method of claim 1, wherein the filter corresponds to a FIR (finite impulse response) filter or an IIR (infinite impulse response) filter.

4. The method of claim 1, wherein the filter inputs of the filter comprises the current prediction sample, one or more prediction samples excluding the current prediction sample, and one or more neighboring reference reconstructed samples from one or more neighboring blocks of the current block.

5. The method of claim 4, wherein the filter inputs of the filter comprise the current prediction sample and four adjacent samples of the current prediction sample at a left position, an upper-left position, an above position and an upper-right position.

6. The method of claim 1, wherein the filter inputs of the filter comprises the current prediction sample, one or more filtered prediction samples before the current prediction sample, and one or more neighboring reference reconstructed samples from one or more neighboring blocks of the current block.

7. The method of claim 1, wherein whether to enable or disable the Intra prediction filtering is determined implicitly according to Intra prediction mode of the current block, one or more Intra prediction modes of one or more neighboring blocks, or both, and wherein the current block and said one or more neighboring blocks corresponds to a PU (prediction unit).

8. The method of claim 7, wherein whether to enable or disable the Intra prediction filtering depends on whether the Intra prediction mode of the current block is an odd or even number.

9. The method of claim 7, wherein whether to enable or disable the Intra prediction filtering depends on whether the Intra prediction mode of the current block is an odd or even number with one or more exception Intra prediction modes selected from a group comprising a planar mode, a DC mode, a vertical mode and a horizontal mode.

10. The method of claim 1, wherein whether to enable or disable the Intra prediction filtering is determined according to a flag signaled in a sequence, view, picture, slice, SPS (sequence parameter set), VPS (video parameter set), APS (adaptation parameter set), CTU (coding tree unit), CTB (coding tree block), LCU (largest coding unit), CU (coding unit), PU (prediction unit), TU level (transform unit), or a combination thereof.

11. The method of claim 1, wherein filter coefficients for the filter are signaled in a sequence, view, picture, slice, SPS (sequence parameter set), VPS (video parameter set), APS (adaptation parameter set), CTU (coding tree unit), CTB (coding tree block), LCU (largest coding unit), CU (coding unit), PU (prediction unit), TU level (transform unit), or a combination thereof.

12. The method of claim 1, wherein filter coefficients for the filter are derived using a Wiener filter design process.

13. The method of claim 12, wherein the filter coefficients for the filter are derived and updated for each picture, slice, CTU (coding tree unit), CTB (coding tree block), LCU (largest coding unit), CU (coding unit), or PU (prediction unit).

14. The method of claim 1, wherein the current block is divided into multiple current sub-units, the initial Intra prediction block is divided into multiple Intra prediction sub-units accordingly, and each Intra prediction sub-unit is filtered and used as a sub-unit prediction for a corresponding current sub-unit.

15. The method of claim 14, wherein boundary samples in each of the multiple Intra prediction sub-units are unfiltered or filtered using a FIR (finite impulse response) filter, and non-boundary samples in each of the multiple Intra prediction sub-units are filtered using an IIR (infinite impulse response) filter.

16. The method of claim 14, wherein whether to enable or disable the Intra prediction filtering for each current sub-unit is according to a predefined rule.

17. The method of claim 1, wherein the current block comprises a luma block and two chroma blocks, the Intra prediction filtering is only applied to the luma block or is applied to the luma block and two chroma blocks.

18. The method of claim 1, wherein the current block consists of multiple color blocks, and wherein one or more flags are used to enable or disable the Intra prediction filtering for the multiple color blocks.

19. The method of claim 1, wherein said one or more reference values are sample values of one or more prediction samples of the Initial Intra prediction block excluding the current prediction sample, or sample values of one or more filtered prediction samples before the current prediction sample.

20. An apparatus for Intra prediction filtering, the apparatus comprising on or more electronic circuits configured to:
receive input data associated with a current block;
determine Intra prediction mode of the current block;
determine initial Intra prediction block based on the Intra prediction mode and neighboring reconstructed samples of the current block;
determine whether to apply filtering to the initial Intra prediction block based on the Intra prediction mode;
in response to determining applying filtering to the initial Intra prediction block, apply a filter to one or more prediction samples of the Initial Intra prediction block to form a filtered Intra prediction block comprising one or more filtered prediction samples; and
apply Intra prediction encoding or decoding to the current block using a filtered Intra prediction block comprising said one or more filtered prediction samples as a predictor for the current block,
wherein filter inputs of the filter comprise at least one of a current prediction sample and one or more reference values associated with one or more non-current prediction samples of the Initial Intra prediction block.

* * * * *